United States Patent [19]

Hope et al.

[11] Patent Number: 4,576,883

[45] Date of Patent: Mar. 18, 1986

[54] CATHODE COMPOSITION AND METHOD FOR SOLID STATE LITHIUM BATTERY

[76] Inventors: Henry F. Hope; Stephen F. Hope, both of 2421 Wyandotte Rd., Willow Grove, Pa. 19090

[21] Appl. No.: 729,643

[22] Filed: May 2, 1985

[51] Int. Cl.$^4$ .............................................. H01M 6/18
[52] U.S. Cl. .................................... 429/192; 429/218; 429/215
[58] Field of Search ............... 429/192, 191, 199, 218, 429/30, 33, 212, 209, 215, 216, 217

[56] References Cited

U.S. PATENT DOCUMENTS

| | | | |
|---|---|---|---|
| 4,357,401 | 11/1982 | Andre et al. | 429/192 |
| 4,471,037 | 9/1984 | Bannister | 429/192 X |
| 4,496,638 | 1/1985 | Sugiuchi et al. | 429/192 |
| 4,520,086 | 5/1985 | Skotheim | 429/192 |

*Primary Examiner*—Anthony Skapars
*Attorney, Agent, or Firm*—Z. T. Wobensmith, III

[57] ABSTRACT

A cathode for a solid-state lithium battery comprising a layer of polymer spheres. Each polymer sphere consists of a vanadium oxide core encapsulated in an ionically and electronically conductive polymeric material.

5 Claims, 2 Drawing Figures

CATHODE COMPOSITION AND METHOD FOR SOLID STATE LITHIUM BATTERY

BACKGROUND OF THE INVENTION

1. Field of the Invention

The invention is directed to a novel cathode construction for an all-solid state lithium electrochemical cell and a method of forming the cathode. In particular, the invention is directed towards the cathode layer of a multilayer electrochemical lithium cell having a polymeric electrolyte layer a cathode layer containing vanadium oxide, and a lithium or lithium/aluminum alloy anode layer.

2. DESCRIPTION OF THE PRIOR ART

Electrochemical cells and batteries have been constructed from a wide variety of materials. Both the electrodes and the dielectric layer have been made from plastic, metal, and other substances. The electrolyte has usually been a liquid but solid material, such as polymers, are now preferred in lithium battery construction.

A solid state battery will avoid many of the problems commonly associated with liquid electrolyte cells. Such problem sinclude electrolyte leakage, dryout, anode passivation, and dendrite formation. In addition, the use of all solid state components simplifies fabrication of the cell and leads to a mechanically stable device. Operation at moderate temperature overcomes the severe problems of corrosion and sealing associated with high temperature fused salt electrolyte or molten electrode systems. Clearly a solid state battery is preferable for many applications to a battery containing liquid electrolyte or electrolyte paste.

It has been preferred when fabricating lithium batteries to use a polymer/inorganic composite as both the cathode layer and the electrolyte layer, which layers may be formed as a film by continuous casting and solvent evaporation. Using this method, large area membranes of 25-50 micrometer thickness may be routinely fabricated. This technique, commonly referred to as the "doctor-blade" technique, results in electrolyte layers which are substantially pinhole-free, retain their integrity over many cycles, and provide excellent interfacial characteristics.

Recent joint studies conducted by the Harwell Laboratory and the Energy Research Laboratory of Odense University have focused upon lithium batteries employing a polymer electrolyte composed of polyethylene oxide compounded with various lithium salts. In these cells, the cathode material is based on $V_6O_{13}$ and the preferred anode consists of a lithium metal foil or a lithium/aluminum foil. Specifically, the cathode is a composite structure formed by intimately mixing pre-milled vanadium oxide with acetylene black, in an electrolyte solution. The electrolyte solution contains polyethylene oxide polymer. The resulting cathode layer, when deposited as a film, consists of a random agglomerate of particles of polymer, carbon, and vanadium oxide. It is reported that the lithium cells so constructed showed improved performance in terms of current density, material utilization, and reproduceabilty. It is suggested that these cells may have application in the production of vehicle traction batteries. See, Hooper, A. et al., Advanced Battery Development (Odense University Press, 1984).

SUMMARY OF THE INVENTION

It has now been found that the performance characteristics of the above-described lithium cells may be dramatically increased by the use of a novel cathode construction. In particular, the present invention is directed towards a composite cathode based on $V_6O_{13}$ having increased surface area, increased performance characteristics, and increased life.

These objectives are achieved by forming the cathode layer of the solid-state battery as a layer of polymer-encapsulated vanadium oxide spheres. The preferred polymer, polyethylene oxide, additionally contains a lithium salt and activated carbon. The spheres, in the form of an emulsion, may be applied as a layer to an electrically conductive substrate.

DESCRIPTION OF THE DRAWINGS

The nature and characteristic features of the invention will be more readily understood from the following description taken in connection with the accompanying drawings forming part hereof in which.

Figure 1:
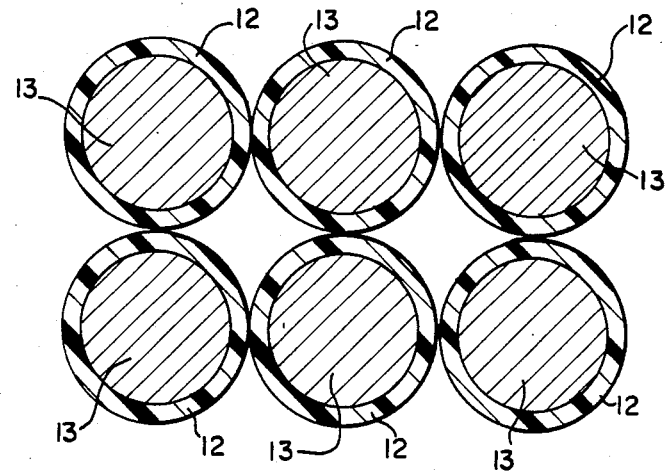
FIG. 1 shows the polymer sphers of the invention as they exist in a layer, i.e. in each sphere in contact with neighboring spheres to form an electronic network.

It should, of course, be understood that the description and drawings herein are illustrative merely and that various modifications anc changes can be made in the structure disclosed without departing from the spirit of the invention.

DESCRIPTION OF THE INVENTION

A lithium solid-state battery consists of an anode layer, a cathode layer and a polymer dielectric layer. The three-layer structure, in the form of a sheet, roll, tape, etc. forms a simple cell or battery. Such structures can employ various additional layers, including current conducting backing layers, insulating layers, and/or bipolar electrode connections. Such simple batteries may be connected or combined in stacks to form multicell electrochemical devices.

Typically, electrochemical cells are formed as simple disc sandwiches with an active area of approximately 0.75 cm². However, large area cells of approximately 85 to 200 cm² may be fabricated using a "swiss-roll" technique around a central mandrel, or a "concertina" configuration, sandwiched between two stainless steel plates. Both of these methods are well-known to the artisan.

The cathode and electrolyte layers of the laminate are produced from the appropriate polymer film using the so-called "doctor-blade" technique. According to this method, a solution of the polymer (or polymer compounded with inorganic material) is prepared in a suitable solvent and cast as a film onto a sheet, for example, of waxed paper, passing beneath a fixed reservoir positioned at one end of a flat platform. The front face of the reservoir is adjustable in height and the setting of the gap between the doctor-blade and the paper sheet determines the thickness of the cast film. Evaporation of the solvent causes a uniform reduction in film thickness by an amount which is dependent on the concentration of the solution. This technique of creating a thin film layer is familiar to those skilled in the art, and can be used to form very thin films of approximately 25-50 micrometer thickness.

The anode layer used in lithium batteries comprises a lithium metal foil or a lithium/aluminum alloy foil. In electrochemical lithium cells a battery grade lithium foil of 350 micrometer thickness has previously been used. Use of this foil represents a large excess of lithium and it is preferable to use a thin anode in the form of a lithium/aluminum alloy formed by cathodic reduction of aluminum foil in a lithium salt solution. Lithium deposited on the surface of the foil is allowed to accumulate to a thickness of 10 to 20 micrometers on the surface of the aluminum foil. The structural integrity of the anode layer is maintained by allowing more than one half of the thickness of the aluminum foil to be unconverted. Aluminum on copper foils, formed by bonding, for example, an 80 micrometer copper foil and a 20 micrometer aluminum foil, will also serve as a satisfactory anode. The anode is then fabricated by the electrochemical conversion of the aluminum foil in non-aqueous liquid electrolyte solution containing lithium salts. Both of these anode structures are compatible with the construction of large area, thin film cells.

The polymeric electrolyte composition is formed by compounding a lithium salt and a polymeric material such as polyethylene oxide. The polyethylene oxide and lithium salt are compounded by, for example, milling the heated polymer with crystals of lithium perchlorate, to achieve substantially uniform mixing. Alternatively, a solvent is combined with the polymer to improve its film-forming qualities and the salt introduced into the polymer in solution. The resulting mixture may be deposited as a film directly onto the cathode layer of the cell. The mixture is applied by the doctor-blade technique referred to previously. This leads to good reproducibility of the electrolyte layer, which is optimally in the order of 25 micrometers.

The cathode layer, formed in accordance with the present invention, consists of a thin layer of polymer spheres. At the core of each polymer sphere is the active cathode material, vanadium oxide. The preferred vanadium oxide compound, $V_6O_{13}$, is prepared by the thermal decomposition of ammonium metavanadate and has an average agglomerated particle size of 100-500 microns. The agglomerates can be further ground to reduce the particle size to the order of several microns.

The finely ground $V_6O_{13}$ particles are encapsulated within conductive polymer to form spheres, as illustrated in FIG. 1. Referring to FIG. 1, polymer spheres 10 consist of a vanadium oxide core 13 encapsulated with conductive polymer material 12. The preferred conductive polymer consists of polyethylene oxide containing an inorganic salt to render the polymer ionically conductive, and carbon black to render the polymer electronically conductive.

The primary advantage of the polymer spheres of the present invention is a large increase in the available active surface area of the cathode. Also, the vanadium oxide cathode material is mechanically fixed within each sphere, which increases the active life of the cathode layer. Further, since each sphere is in contact with other conductive spheres, an electronic network or grid exists across and through the cathode, as shown in FIG. 1. The voids existing between the spheres allow diffusional access to any part of the cathode.

The spheres are prepared by forming an emulsion using the polyethylene oxide polymer as a binder. The polymer may be compounded with a lithium salt and a carbon black prior to its introduction into the emulsion. Inorganic salts which are preferred are of the type employed in the electrolyte layer of lithium batteries, and include $LiClO_4$, $NaClO_4$, $LiF_3CSO_3$, and $LiBF_4$. Carbon or acetylene black is added to the polymer, to approximately 5% by weight, to provide electrical conductivity.

The compounded polymer and finely divided $V_6O_{13}$ are emulsified in a suitable organic solvent. As a result, each particle or agglomerate of vanadium oxide becomes encapsulated by polymer and retains the resulting spherical form within the emulsion. Accordingly, when the emulsion is applied as a thin film and the solvent removed, a layer of spheres is deposited on the substrate. The film is applied by, for example, the "doctor-blade" method, and the resulting film may be of any desired thickness.

Figure 2:
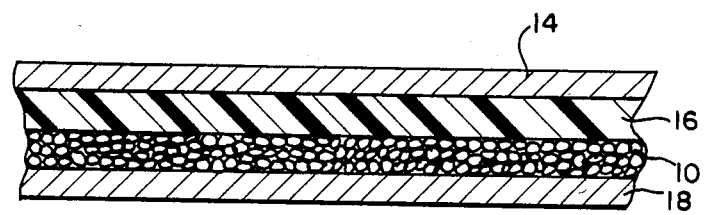
FIG. 2 shows a solid state lithium battery employing a layer of polymer spheres as the cathode.

Referring to FIG. 2, a solid state lithium battery structure which embodies the invention is shown. Layer 14 corresponds to the anode, which as described previously, may consist of a lithium or lithium/aluminum foil. The layer shown as 16 corresponds to the electrolyte layer, which preferably consists of polyethylene oxide and an inorganic salt. Layer 10 comprises the cathode formed of a multiplicity of polymer spheres containing vanadium oxide, as disclosed herein. Layer 18 represents a current-collecting base layer, which may consist of, for example, a nickel or copper foil.

The 4 layer laminate shown in FIG. 2 may be prepared as a continuous sheet or roll. Preferably, one layer is laminated directly onto the underlying layer in a continous process.

In a preferred embodiment of the present invention, additional ionically conductive polyethylene oxide is applied to the layer of spheres to form a matrix around the spheres and fill the voids therebetween. This increases the mechanical stability of the layer and provides improved diffusional properties.

It has been found preferable to employ vanadium oxide as approximately 50%, by volume, of the total cathode, including the added matrix material, if used.

When forming a lithium battery, it is preferred to deposit the cathode layer directly onto the current-collecting base layer. Accordingly, in the present invention, the emulsion of polymer spheres may be applied directly to the foil base as a thin layer.

We claim:

1. In a solid-state lithium battery of the type comprising a lithium or lithium/aluminum anode, a polymeric electrolyte, and a cathode based on vanadium oxide, the improvement comprising:

a cathode comprising a multiplicity of spheres, each sphere consisting of a vanadium oxide core encapsulated in a polymer film, said polymer film containing an inorganic salt and an activated carbon.

2. The battery as set forth in claim 1 wherein said polymer film consists of polyethylene oxide.

3. The battery as set forth in claim 2, wherein said inorganic salt is selected from the group consisting of $LiClO_4$, $NaClO_4$, $LiF_3CSO_3$, and $LiBF_4$.

4. The battery as set forth in claim 2 wherein said spheres are prepared by emulsifying vanadium oxide powder in an organic solvent using said polyethylene oxide as a binder.

5. The battery set forth in claim 1 wherein the cathode consists of approximately 50% by volume of vanadium oxide.

* * * * *

UNITED STATES PATENT AND TRADEMARK OFFICE
CERTIFICATE OF CORRECTION

PATENT NO. : 4,576,883

DATED : March 18, 1986

INVENTOR(S) : Henry F. Hope and Stephen F. Hope

It is certified that error appears in the above-identified patent and that said Letters Patent is hereby corrected as shown below:

Column 1,

Line 25, "problem sinclude" should read -- problems include --.

Column 4,

Line 29, "4layer" should read -- 4-layer --.

Signed and Sealed this

Seventeenth Day of June 1986

[SEAL]

Attest:

Attesting Officer

DONALD J. QUIGG

Commissioner of Patents and Trademarks